US008616889B2

(12) United States Patent
Lærdal et al.

(10) Patent No.: US 8,616,889 B2
(45) Date of Patent: Dec. 31, 2013

(54) RESUSCITATION TRAINING MANIKIN

(75) Inventors: Tore Lærdal, Stavanger (NO); Harald Eikeland, Sandnes (NO); Jens Petter Ianke, Sola (NO)

(73) Assignee: Laerdal Medical AS, Stavanger (NO)

( * ) Notice: Subject to any disclaimer, the term of this patent is extended or adjusted under 35 U.S.C. 154(b) by 24 days.

(21) Appl. No.: 10/555,561

(22) PCT Filed: May 7, 2004

(86) PCT No.: PCT/NO2004/000137
§ 371 (c)(1),
(2), (4) Date: Jan. 10, 2007

(87) PCT Pub. No.: WO2004/100107
PCT Pub. Date: Nov. 18, 2004

(65) Prior Publication Data
US 2007/0105082 A1    May 10, 2007

(30) Foreign Application Priority Data

May 9, 2003 (NO) .................................. 20032105

(51) Int. Cl.
*G09B 23/28* (2006.01)
(52) U.S. Cl.
USPC ........... 434/191; 434/261; 434/262; 434/263; 434/264; 434/265; 434/266; 434/267; 434/271
(58) Field of Classification Search
USPC ................................. 434/191, 261–267, 271
See application file for complete search history.

(56) References Cited

U.S. PATENT DOCUMENTS

| | | | | |
|---|---|---|---|---|
| 3,152,404 A | * | 10/1964 | Wilson et al. | 434/265 |
| 3,199,255 A | | 8/1965 | Robertson et al. | 35/17 |
| 3,562,924 A | * | 2/1971 | Baermann et al. | 434/265 |
| 3,562,925 A | | 2/1971 | Baermann et al. | 35/17 |
| 3,736,362 A | * | 5/1973 | Laerdal | 434/265 |
| 3,872,609 A | * | 3/1975 | Smrcka | 434/265 |

(Continued)

FOREIGN PATENT DOCUMENTS

| | | |
|---|---|---|
| CN | 95217391.3 | 12/1996 |
| CN | 2512067 Y | 9/2002 |
| GB | 1365933 A | 9/1971 |

OTHER PUBLICATIONS

International Search Report, Jul. 5, 2004, PCT.

(Continued)

*Primary Examiner* — Xuan Thai
*Assistant Examiner* — Alvin Carlos
(74) *Attorney, Agent, or Firm* — Lewis and Roca LLP

(57) ABSTRACT

A manikin for practicing resuscitation, comprising an inflatable body (1). The inflatable body (1) is adapted to absorb compression force exerted during simulated chest compression. Preferably, the manikin also comprises a chest plate (4), the chest plate (4) acting as a pressure distributor on the inflatable body (1). The chest plate (4) being connected to the inflatable body (1) by elastic means (22). The manikin may also comprise a lung part (2), the lung part being connected to a face mask (3). The lung (2) being adapted for inflation through the mouth and/or the nose of the face mask (3). The lung (2) having a chest portion (13) positioned substantially parallel to the chest portion (5) of the inflatable body (1). The face mask (3) being positioned at a head portion (7) of the inflatable body (1).

24 Claims, 9 Drawing Sheets

(56) References Cited

U.S. PATENT DOCUMENTS

Figure 1:
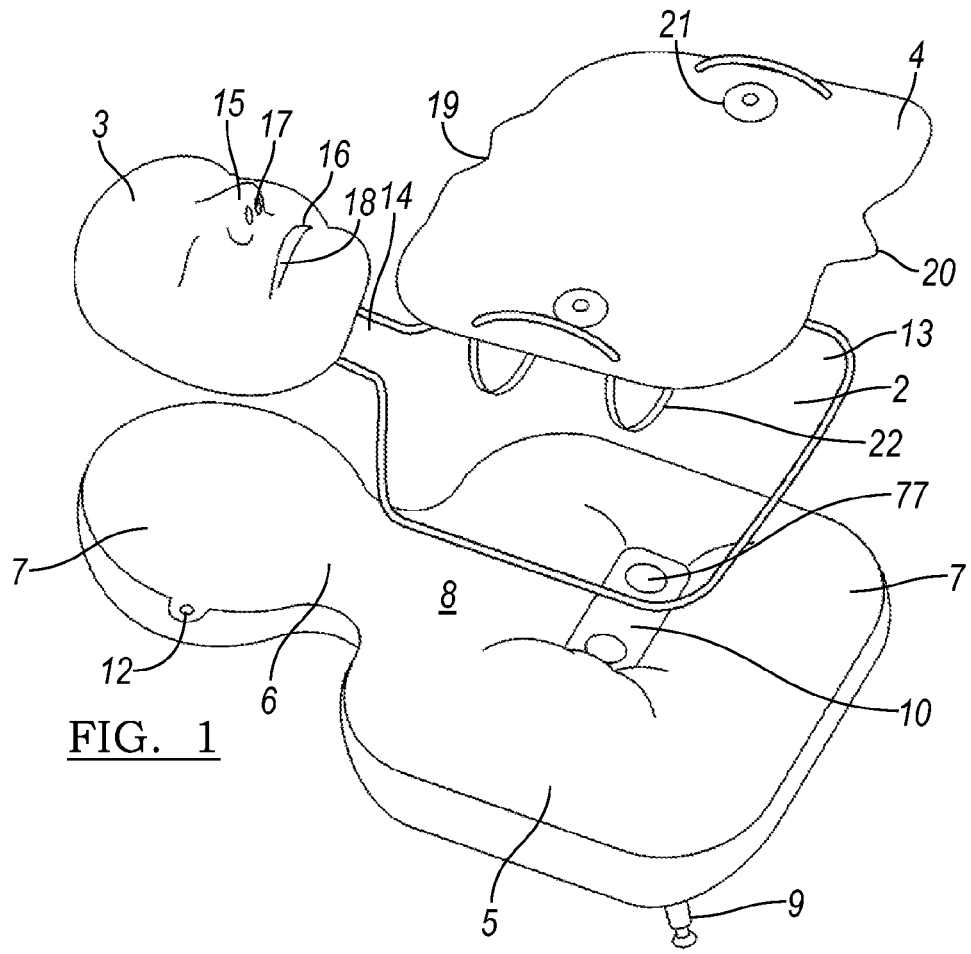

| | | | |
|---|---|---|---|
| 3,994,075 A * | 11/1976 | Kohnke | 434/265 |
| 3,999,309 A * | 12/1976 | Gonzalez | 434/272 |
| 4,001,950 A * | 1/1977 | Blumensaadt | 434/265 |
| 4,087,933 A * | 5/1978 | Strongin | 446/183 |
| 4,194,303 A * | 3/1980 | Heller | 434/267 |
| 4,773,865 A * | 9/1988 | Baldwin | 434/268 |
| 4,801,268 A | 1/1989 | Køhnke | 434/265 |
| 4,984,987 A * | 1/1991 | Brault et al. | 434/265 |
| 5,195,896 A * | 3/1993 | Sweeney et al. | 434/265 |
| 5,238,409 A * | 8/1993 | Brault et al. | 434/265 |
| 5,249,968 A * | 10/1993 | Brault et al. | 434/265 |
| 5,256,070 A * | 10/1993 | Garth et al. | 434/265 |
| 5,286,206 A | 2/1994 | Epstein et al. | 434/265 |
| 5,312,259 A * | 5/1994 | Flynn | 434/265 |
| 5,330,514 A * | 7/1994 | Egelandsdal et al. | 434/265 |
| 5,419,729 A * | 5/1995 | Gross | 446/183 |
| 5,423,685 A * | 6/1995 | Adamson et al. | 434/265 |
| 5,468,151 A | 11/1995 | Egelandsdal et al. | |
| 5,540,592 A * | 7/1996 | Scheinberg et al. | 434/265 |
| 5,593,306 A * | 1/1997 | Kohnke | 434/267 |
| 5,628,633 A * | 5/1997 | Lehman | 434/265 |
| 5,815,833 A * | 10/1998 | Kuo | 2/69.5 |
| 5,823,787 A * | 10/1998 | Gonzalez et al. | 434/265 |
| 5,885,084 A * | 3/1999 | Pastrick et al. | 434/265 |
| 5,913,708 A * | 6/1999 | Gross | 446/385 |
| 6,227,864 B1 | 5/2001 | Egelandsdal et al. | 434/265 |
| 6,234,804 B1 * | 5/2001 | Yong | 434/267 |
| 6,500,009 B1 | 12/2002 | Brault et al. | 434/265 |
| 6,708,355 B1 * | 3/2004 | Wang et al. | 5/644 |
| 6,780,017 B2 * | 8/2004 | Pastrick et al. | 434/265 |
| 7,223,103 B2 * | 5/2007 | Cantrell et al. | 434/265 |
| 2003/0022142 A1 * | 1/2003 | Pastrick et al. | 434/265 |
| 2004/0134943 A1 * | 7/2004 | Huang | 223/67 |

OTHER PUBLICATIONS

PCT Application No. PCT/DE98/00095 published as WO 98/30994 in Germany, dated Jul. 16, 1998, 40 pages.

\* cited by examiner

RESUSCITATION TRAINING MANIKIN

The present invention relates to a manikin for practising resuscitation, primarily chest compressions and lung ventilation, comprising an inflatable body.

The present applicant, Laerdal Medical AS, has produced and marketed resuscitation manikins since the 1960's under the trademark Resusci Anne®. The first manikin of this type had an inflatable body that was connected to a generally rigid head. To facilitate chest compression a steel ring circumscribed the chest of the inflatable body. The trainee pressed with his hands against the top of this steel ring, which deformed like a blade spring under the pressure. The only function of the inflatable body was to give the manikin an appearance of a human being. The inflatable body had no function in the resuscitation.

The Resusci Anne® manikin and its sister products have developed substantially since this first model. However, an inflatable body has not been used since. Instead various embodiments of a rigid body has been used, that contain features adapted for chest compression, lung inflation and, by the time, several advanced functions. Examples of these manikins are show in WO 98/30994 and U.S. Pat. No. 5,468,151.

An object of the present invention is to provide a low cost resuscitation manikin that can be packed into a small size for transport and storage.

Another object of the present invention is to provide a resuscitation manikin that gives a high degree of functional correctness during chest compression and lung inflation.

Another object of the present invention is to provide a resuscitation manikin that contains few parts and is easy to assemble and use.

One or more of the above objects is achieved by the present invention wherein the inflatable body is adapted to absorb compression force exerted during simulated chest compression.

By having an inflatable body that is adapted to absorb compression force, a low cost manikin that can be compacted into a small size is achieved. Preferably the manikin can be packed in a flat box that can be sent by letter mail.

Since the manikin contains few parts that are easy to produce and assemble, it is possible to achieve a low sales price and mass production.

Due to its small size, low price and ease of use this manikin can offer quality and affordable basic life support training to a broader public, also in developing countries, which cannot afford to by the manikins currently on the market. It also makes it possible for schools, scout groups and other organisations running life saving courses, to hand out personal manikins to pupils.

Preferably, the inflatable body of the manikin comprises a chest portion and a head portion, the inflation chambers of the two portions being in communication with each other, the head portion acting as an expansion chamber during chest compression. Thereby a realistic chest compression scenario is achieved in which the chest will yield to force.

Preferably, the inflatable body has a central portion defining a cavity, the cavity being circumscribed by a generally ring-shaped inflatable portion. Thereby the body will lie stable on a surface with a minimum of wobbling.

Preferably, the manikin comprises a chest plate, the chest plate acting as a pressure distributor on the inflatable body, the chest plate being connected to the inflatable body by elastic means. Thereby an even more realistic scenario during chest compression is achieved.

Preferably, the manikin comprises a lung part, the lung part being connected to a face mask, the lung being adapted for inflation through the mouth and/or the nose of the face mask, the lung having a chest portion positioned substantially parallel to the chest portion of the inflatable body, the face mask being positioned at the head portion of the inflatable body. Thereby a capacity for lung ventilation training is achieved.

Preferably, the cavity of the central portion receiving a portion of the lung during a first phase of lung inflation. Thereby is a realistic first phase of lung inflation achieved, during which minimal or no chest heaving occurs.

Preferably, the side of the cavity facing the lung has an elastic means for forcing the portion of the lung expanded into the cavity substantially out of the cavity. Thereby a substantially complete emptying of the lung is achieved between each lung inflation.

Preferably the face mask has a chin portion comprising an edge, the edge pinching a portion of the lung against the inflatable body in a first state, in which first state the head portion is lying substantially in the same plane as the chest portion of the inflatable body, and the edge being lifted away from the lung portion when the head portion is tilted relative to the chest portion, so that the chin portion is lifted simultaneously. Thereby a realistic requirement to tilt the head of the manikin backwards and lift of the chin is achieved.

Preferably, a chest compression feedback device is integrated in the chest plate, the feedback device emitting a audible or visible signal when a predetermined compression force or depth is exceeded, optionally also having a means for indication sufficient lung inflation. This will provide for enhanced training possibilities as the trainee gets feedback on the quality of the chest compression and lung inflation.

Preferably, the manikin is adapted to be deflated and folded into a small height together with a chest plate, lung part and face mask, to facilitate storage and transport.

When in the following and the previous terms indication directions, like underside, rear side, below, above and the like, are used, these terms refer to the manikin in its position for used, i.e. chest compression and lung inflation. They are not to be construed to have any limiting intention on the protective scope of the invention.

Figure 2:
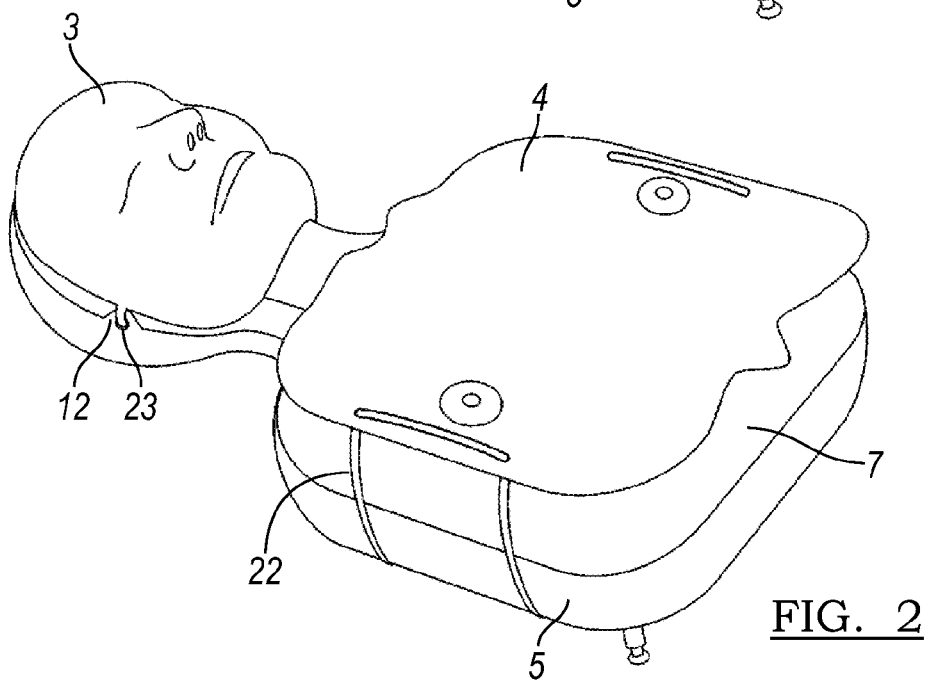
Figure 3:
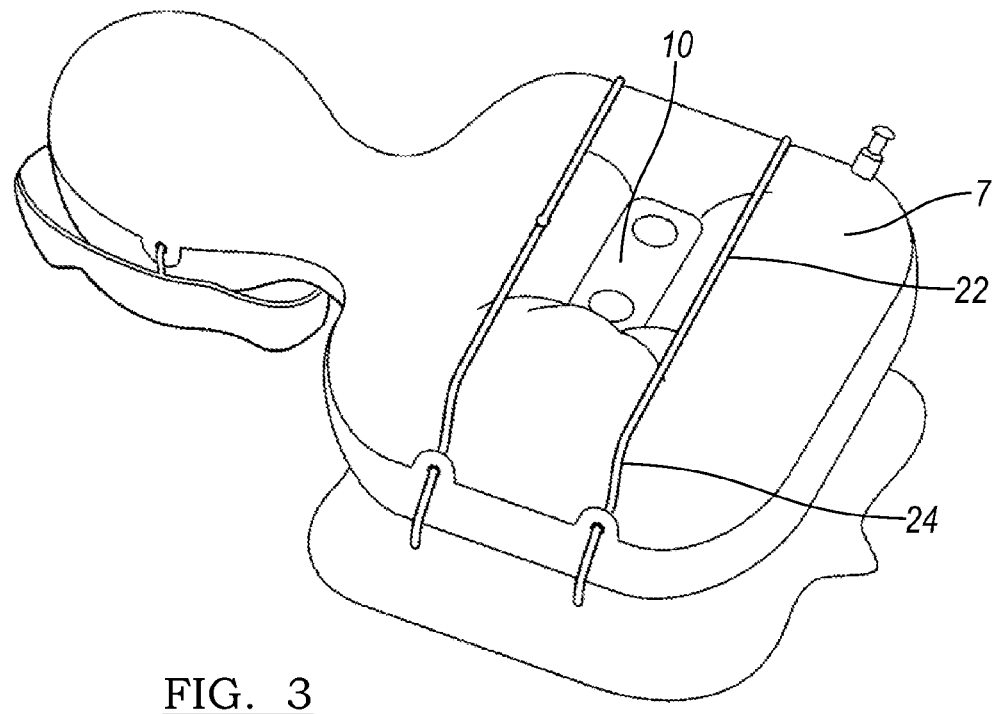
Figure 4:
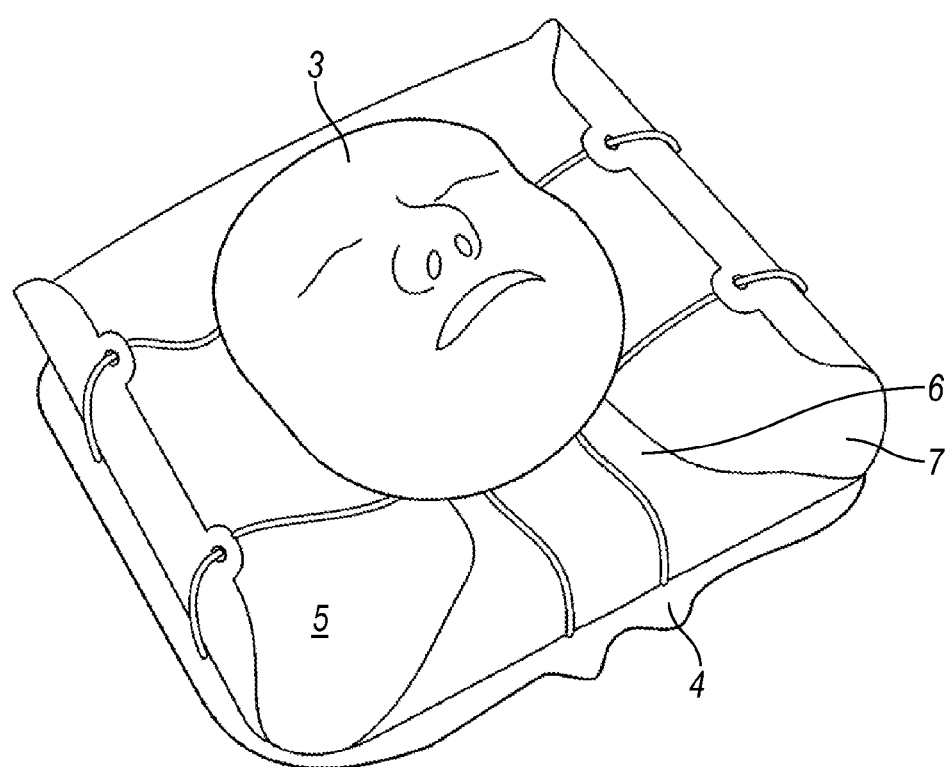
Figure 5A:
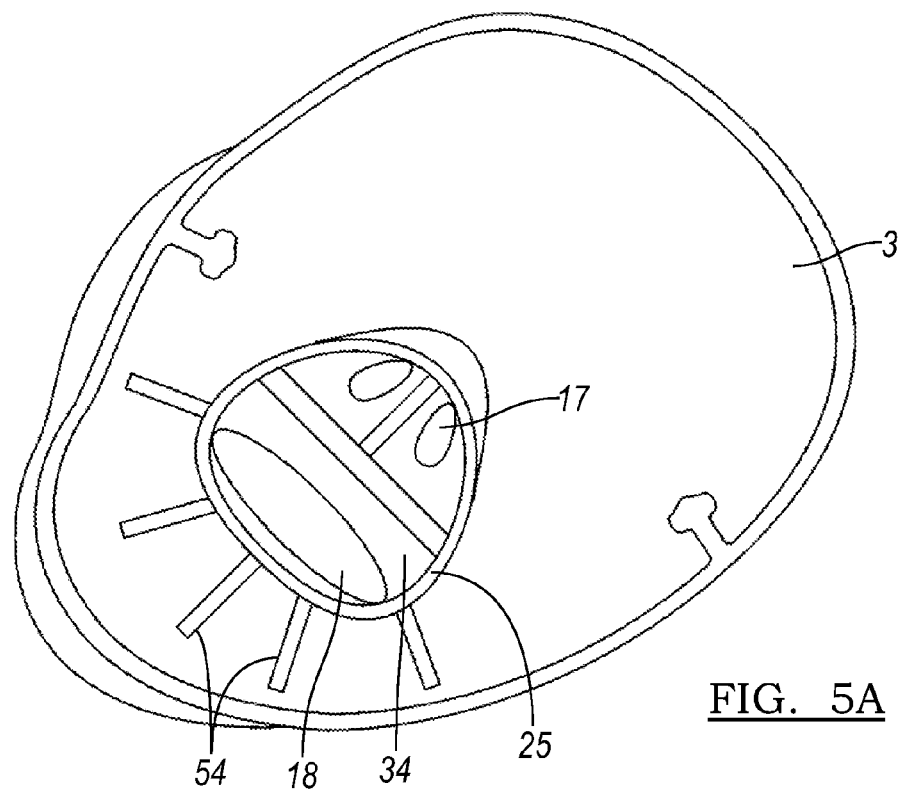
Figure 5B:
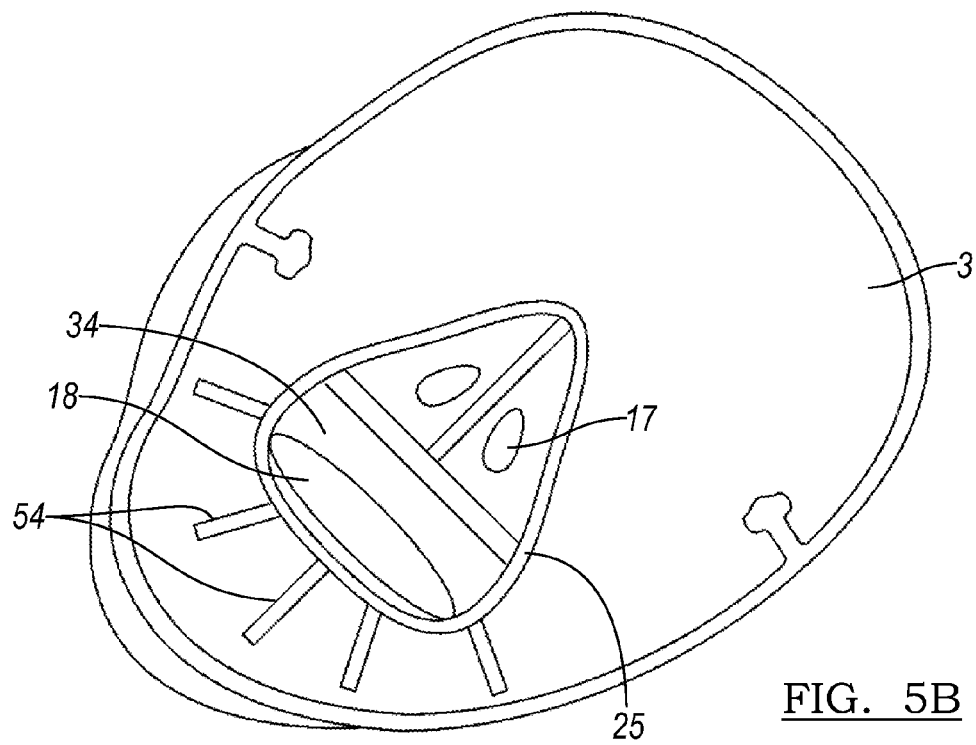
Figure 5C:
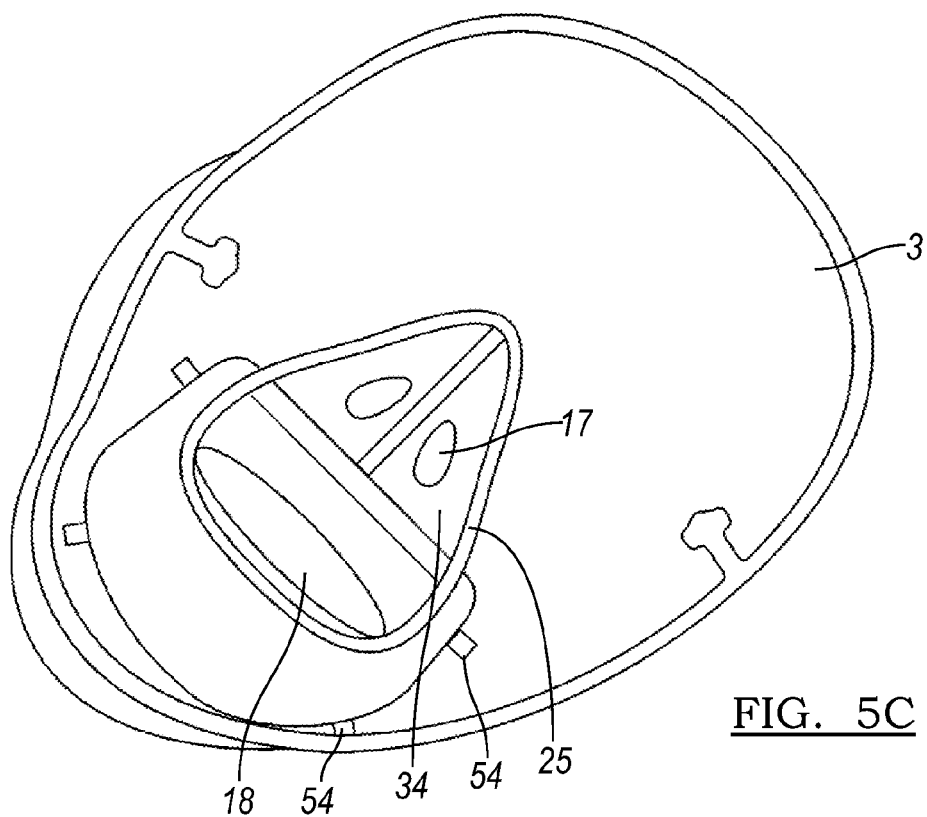
Figure 5D:
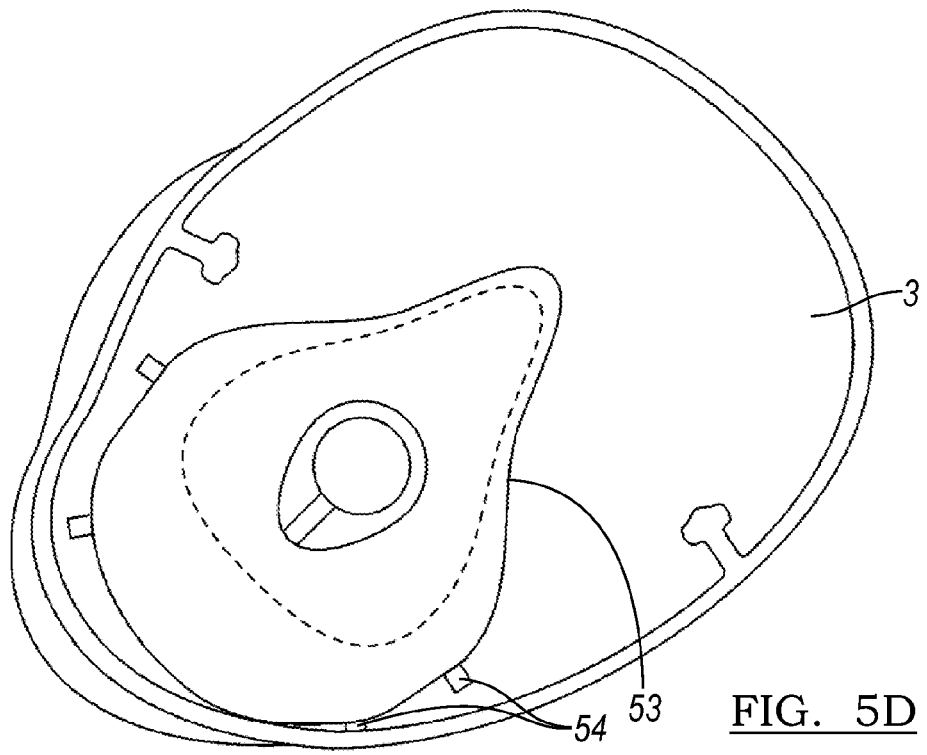
Figure 6:
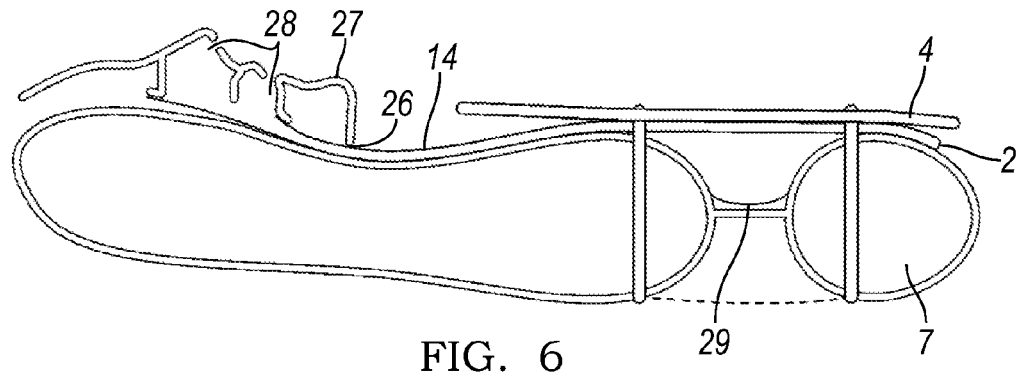
Figure 7:
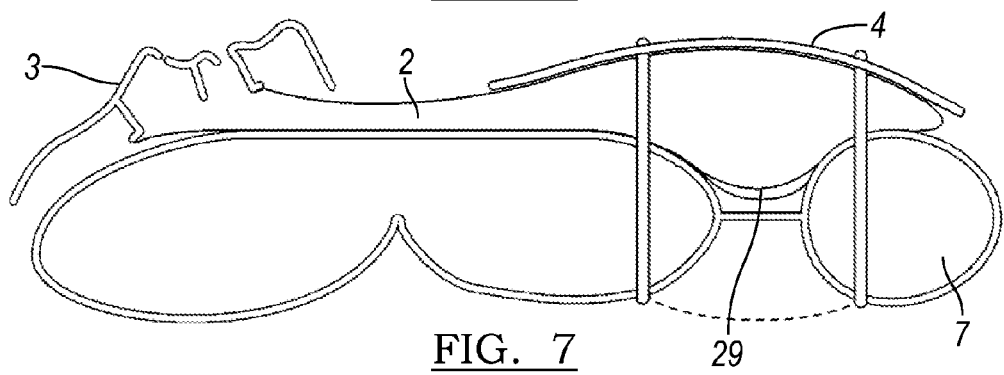
Figure 8:
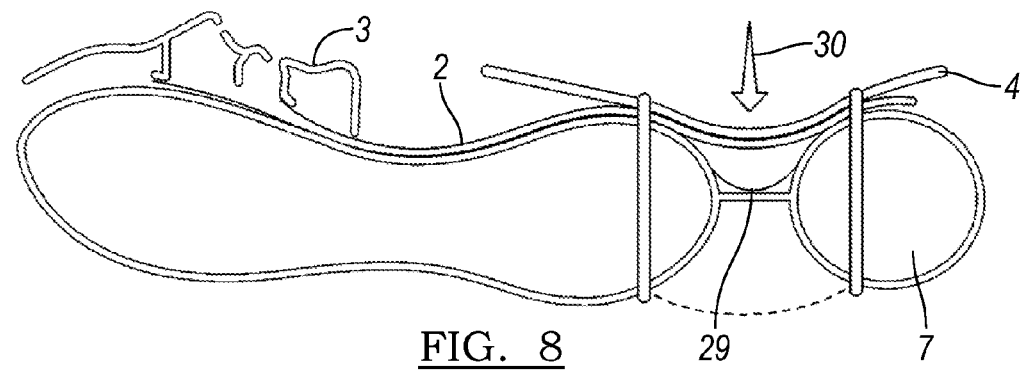
Figure 9:
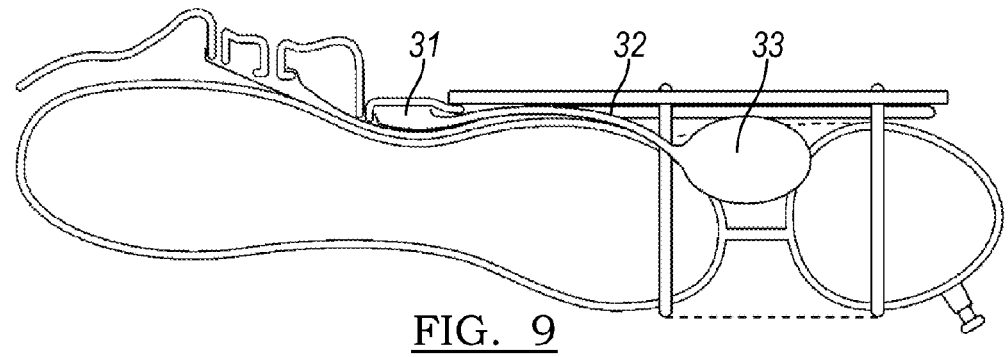
Figure 10:
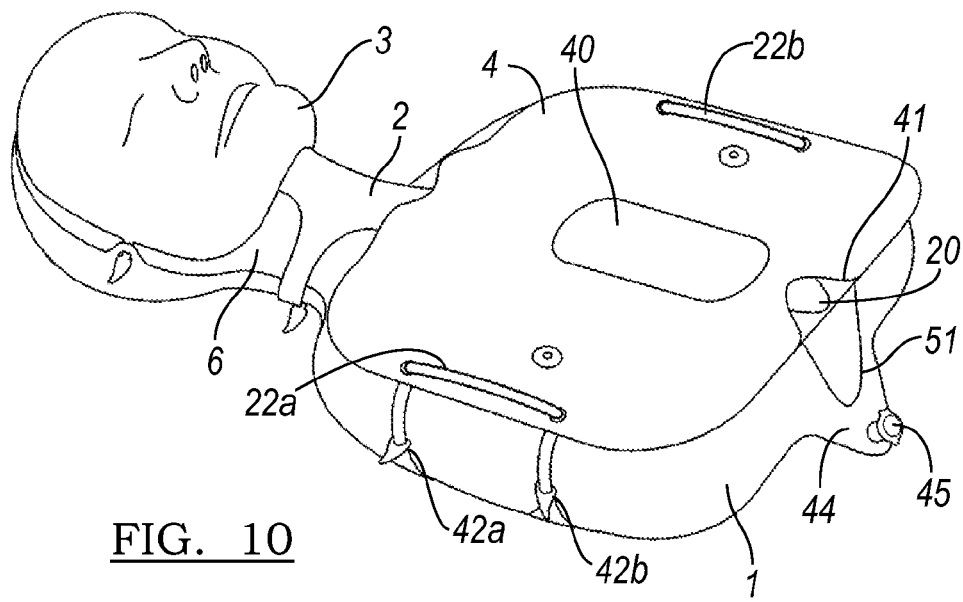
Figure 11:
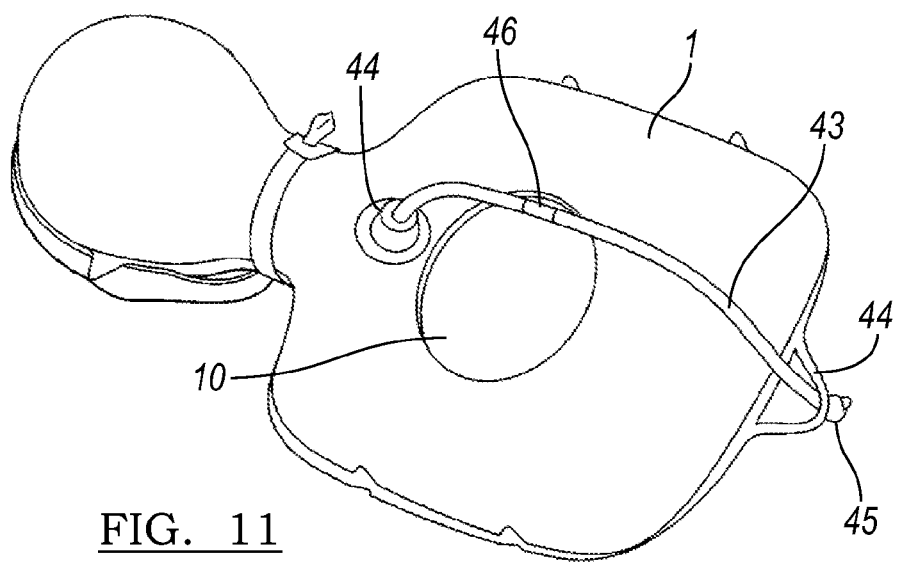
Figure 12A:
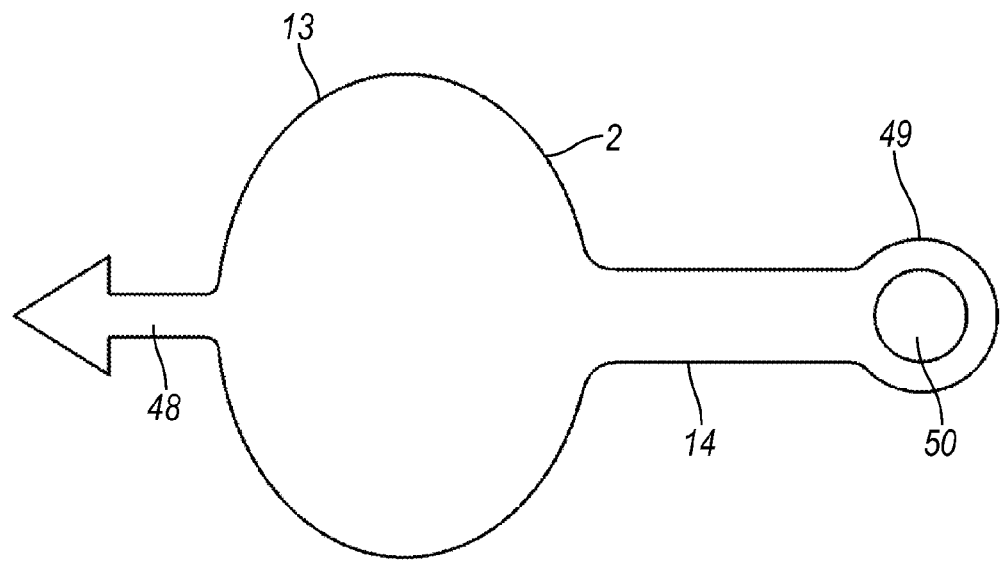
Figure 12B:
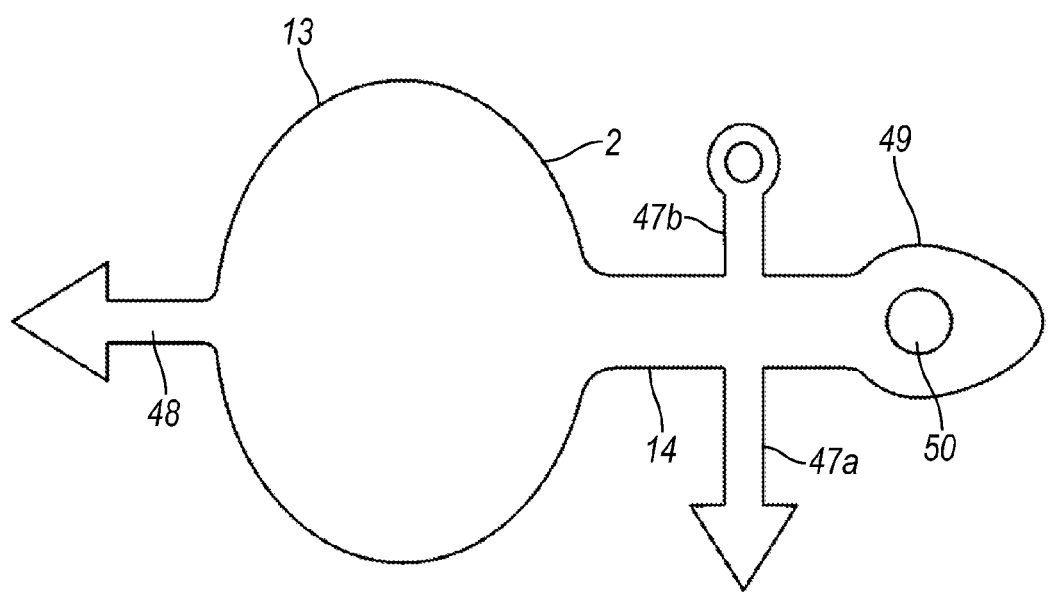
Figure 13A:
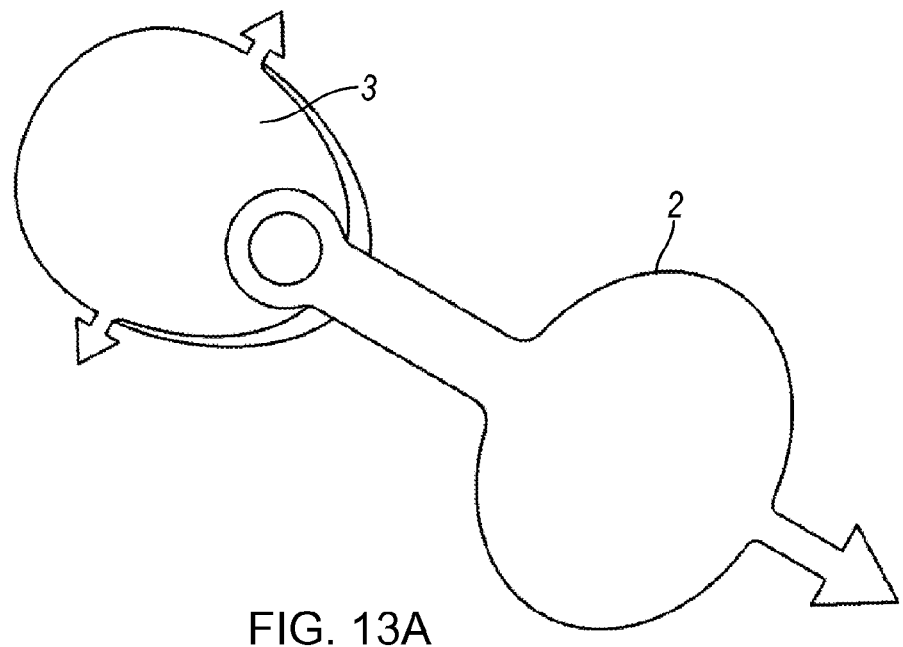
Figure 13B:
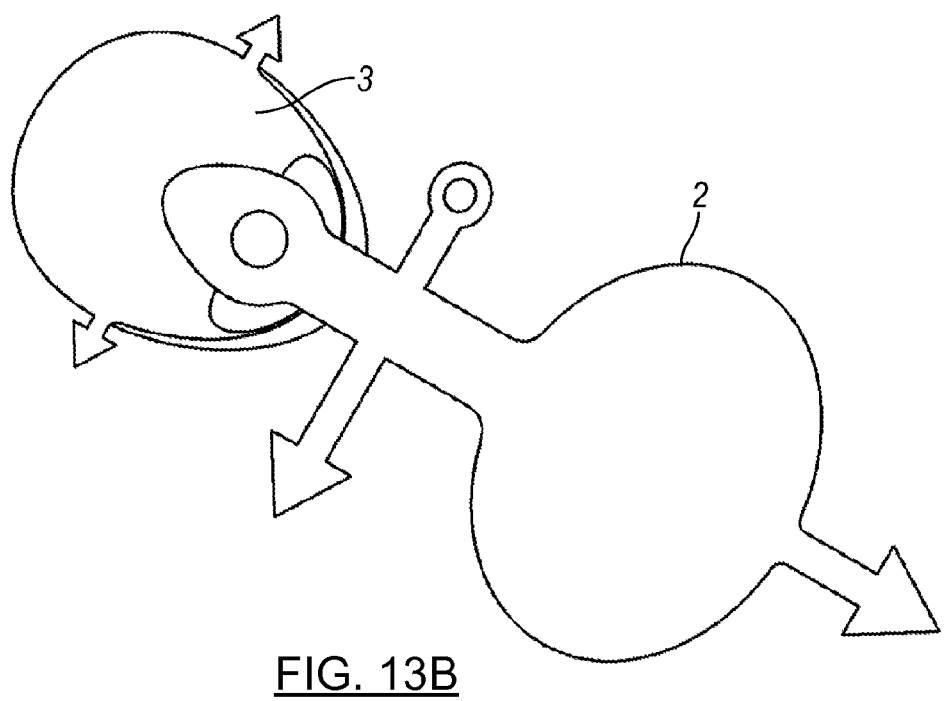
Figure 13C:
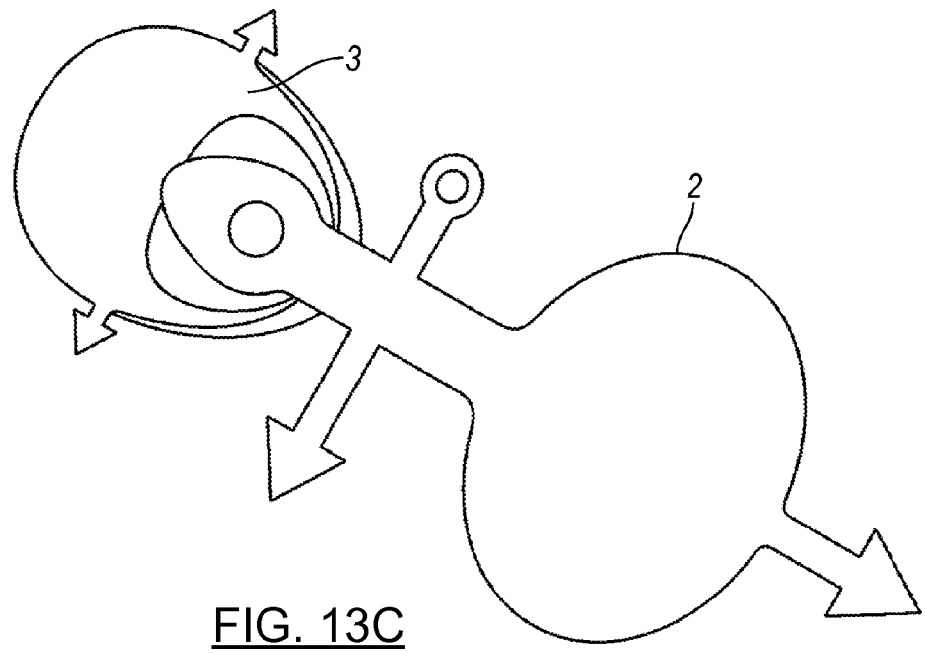
Figure 14:
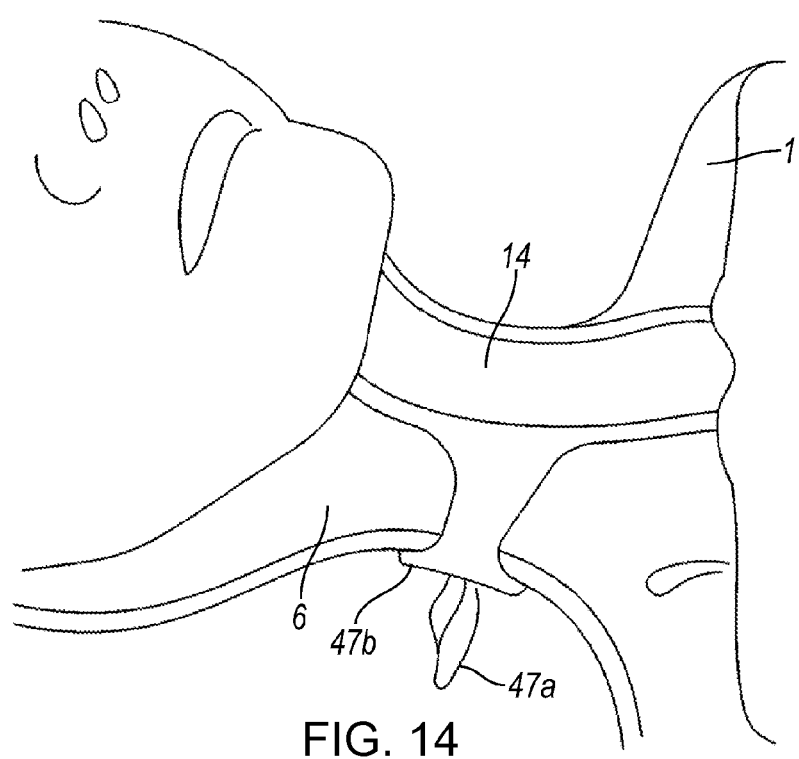

The present invention will be described in full detail with reference to a preferred embodiment shown in the enclosed drawings, in which:

FIG. 1 shows an exploded view of the manikin of the invention, illustrating the main components, FIG. 2 shows the manikin of the invention in assembled and inflated state, FIG. 3 shows the underside of the manikin of the invention in inflated state, FIG. 4 shows the manikin in deflated and folded state, ready for transport or storage, FIG. 5 shows the backside of the face mask, FIG. 6 shows a longitudinal section through the manikin in a ready for use state, FIG. 7 shows a longitudinal section through the manikin during lung inflation, FIG. 8 shows a longitudinal section through the manikin during compression, FIG. 9 shows a longitudinal section through an alternative embodiment of the manikin of the present invention, FIG. 10 shows an alternative and preferred embodiment of the present invention in assembled an inflated state, FIG. 11 shows the underside of the manikin according to the embodiment of FIG. 10, FIG. 12A shows a lung for use in the embodiment of FIG. 10, FIG. 12b shows the underside of a face mask for use in the embodiment of FIG. 10, FIGS. 13A-C show a lung and face mask combination for use in the embodiment of FIG. 10, and FIG. 14 shows a portion of the manikin of FIG. 10, showing the neck portion in detail.

The manikin of the present invention has in a first embodiment four main parts, as shown in FIG. 1; an inflatable body 1, a lung 2, a face mask 3 and a chest plate 4.

The inflatable body has a chest portion 5, a neck portion 6 and a head portion 7. These portions have a common air chamber 8, which can be filled with or emptied of air or gas through a self-sealing valve 9. The valve 9 may be self sealing. The valve 9 is suitably a standard valve, inter alia used for bathing toys, air mattresses and the like. To fill the body the user may use his mouth to blow through the valve or a pump, e.g., a pump suitable for inflating bathing mattresses.

The air chamber 8 is in chest portion 5 of the body 1 generally ring shaped leaving a central portion 10 that has no capacity for accommodating air and is circumscribed by the chamber 8, thus forming a cavity in the central part 10. In the central portion a thin sheet may be present that has one or more holes 11 therethrough. The effect of this chest construction is that the body will lie with a large contact area against a surface, thus being stable and without the tendency to wobble. If the chamber 8 extended over the whole of the chest portion 5, this would result in a more or less spherical chest portion that would have contact with the underlying surface only at the central part.

The ring-shape of the chest portion 5 adapt chest pressure exercised on the chest plate 4 of the same magnitude as recommended for chest compression in an average adult person and provides resistance and deflection of the same magnitude as in the average adult person.

The inflatable body has ears 12 for fastening the face mask 3, and optionally also ears (not shown for fastening the chest plate 4.

The lung 2 consists of two plastic foils welded together at the edges. The lung 2 has a chest portion 13 that has approximately the same shape as and a slightly smaller size than the chest portion 5 of the body 1, and a neck portion 14 that is a little narrower than the neck portion 6 of the body 1. The lung is attached to the face mask 3 at the end of the neck portion 14, as will be explained in the following.

The face mask is shaped with an appearance of a human face, with inter alia a nose 15, a mouth 16 chin, forehead and jaw 27. The nose and the mouth have holes 17, 18 extending through the mask. The face mask 3 is made of a relatively soft plastic material that will yield to finger pressure, but nevertheless is capable to maintain its shape.

The chest plate 4 is made of a relatively stiff plastic material. It has the generally same shape and size as the chest portion 5 of the body 1. At one edge of the chest plate 4, facing the face mask 3, the chest plate has a notch 19 that resembles the upper sternal notch of a human being and at the opposite edge has a protruding feature 20 resembling the Xiphoid process of a human being. These features 19, 20 will assist the trainee in recognising reference points on the human body. The lower end of the lung may also be fasten to the chest plate by hooking an ear (not shown) formed on the lung onto the xyphoid process of the sternum. The chest plate 4 also has nipples 21 painted or otherwise formed on its upper surface. The upper surface of the chest plate may be covered by a soft material with a high friction coefficient, e.g. by moulding the soft material onto a part of or the whole upper surface of the chest plate 4. The soft material will prevent slipping and fatigue on the hands of the trainee.

An elastic cord 22 is fastened to the chest plate 4. This cord 22 is used to hold the chest plate 4 against the inflatable body 1. It also has an additional purpose that will be explained in the following.

FIG. 2 shows the manikin assembled and with the body 1 in fully inflated state. As shown the elastic cord 22 extends around the chest portion 5 of the body 1 and holds the chest plate 5 in position against the body 1. The mask is fastened to the body 1 by threading plastic pins 23 extending from the side of the mask through holes in the ears 12 on the side of the head portion 7. The elastic cord 22 may also be the threaded through holes on a similar type of ears on the side of the chest portion 5.

In FIG. 3 the underside of the manikin is shown. As is evident from this view the inflatable body 1 is symmetrical relative to a horizontal plane and also to a vertical longitudinal plane (except for the valve of course). The elastic cord 22 is tensioned enough to form a small depression in the inflatable body 1, thereby forming a groove 24 extending form the central portion 10 to the side of the body 1. The purpose of this groove 24 is to conduct air trapped in the central portion to the outside during compression and let air into the central portion area to prevent the body from suctioning to the surface on which it is lying.

In FIG. 4 the body 1 has been deflated and the body 1 is folded over at the intersection between the chest portion 5 and the neck portion 6 so that the face mask 3 is situated at one side of the manikin and the chest plate 4 at the opposite side. The side edges of the chest portion 5 of the body 1 is folded inwardly to a small extent. In this state the manikin may for example take up a smaller area than an A4 paper sheet and build less than 4 cm in height.

FIG. 5a-d shows the rear side or inside of the face mask 3. The holes 17, 18 through the nose and the mouth are visible in FIGS. 5a-c. These holes 17, 18 extend into a common cavity 34 at the rear side of the face mask 3. Around this cavity 34 is formed an upwardly extending flange 25. The opening at the end of the neck portion 14 of the lung is fixed to this flange 25. This can be done by welding, gluing, snap fit or by any other suitable means. The fixation may be permanent or non-permanent to allow for a changing of the lung. The flange 25 may be substantially circular as shown in FIG. 5a or oblong as shown in FIGS. 5b and c. To stiffen the mask ribs 54 may be formed on the rear side. This will facilitate the training in use of a barrier ventilation device on top of the manikin's face mask, since the mask will resist deformation due to the pressure from the mask.

In FIG. 5c is shown a chin support plate 52 to support the chin portion of the face mask. In FIG. 5d is shown a support and coupling plate 53 that functions as a support for the chin portion and the moth and nose region as well as a coupling piece for a detachable lung 2. The coupling piece is designed to form a connection between the lung and the mask, providing for a changeable lung. With a changeable lung it is possible to make the lung disposable so that it may be disposed of after use. The mask is preferably designed to be easy to clean. The support plate and lung coupling piece 52 may be coupled to the flange 25 on the inside of the face mask 3, trapping the edge of the opening 50 of the lung between the coupling piece 52 and the flange 25.

FIG. 6 shows a longitudinal section though the manikin in a non-influenced state. As is evident from this view the mask has an edge 26 at the jaw 27 that rests against the neck portion 14 of the lung 2, pinching the neck portion 14 of the lung between the edge 26 and the neck portion 6 of the inflated body 1, thus closing the communication between the opening 28 of the lung 2 and the chest portion 13 of the lung 2. The weight of the mask creates a sufficient pressure to prevent the trainee from blowing air into the lung 2, unless the chin portion is lifted.

To be able to blow air into the lung 2, the trainee must tilt the head portion 7 of the body backwards (see FIG. 7), just like he is required to do with an unconscious human being. This backward tilting of the head portion 6 lifts the edge 26 of the jaw 27 off from the neck portion 14 of the lung 2 and opens the communication down into the chest portion 13 of the lung 2. Inspiration can be performed as exhaled air resuscitation performed mouth-to-mouth or mouth-to-nose. A realistic inspiration volume is required to fill the lung sufficiently to visibly raise the chest. The inflation of the lung 2 will in a first phase have the result that the lung protrudes down and into the cavity in the central portion 10 of the chest portion 5 of the body 1. During this phase the chest plate 4 will not lift. Exactly the same effect will take place when ventilating a human being. The lung will expand inwardly of the body before the inflation results in a chest heaving. In a second phase the lung will lift the chest plate 4 as shown in FIG. 7.

The deflation of the lung is facilitated by the chest plate 4 pressing the air out of the lung 2, also by the aid of the elastic cords 22. Between the lung 2 and the cavity of the central portion 10 an elastic sheet of material 29 or a plurality of elastic bands may be situated. This sheet 29 or bands will conveniently be welded or glued to the body 1. The sheet 29 or bands will act to de-inflate the portion of the lung 2 extending into the cavity of the central portion 10. These functions will also have the effect of spontaneous expiration, as on a real human being.

FIG. 8 shows the manikin during chest compression, simulating heart compression. A downward force 30 is exerted against the top surface of the chest plate 4 between the nipples 21. The upper sternal notch 19 and the sternal xyphoid process 20 will also assist the trainee in locating the correct position of the hands. The chest plate will distribute the pressure over the chest portion 5 of the body 1. The pressure will compress the chest portion 5 and force air into the neck portion 6 and the head portion 7, which will expand to some degree and act as an expansion chamber. The counter pressure exerted by the body 1 gives a realistic feel of chest compression. Preferably, the deflection should be within the recommended range of 38-51 mm, when the recommended force is exerted.

To facilitate in the learning process, a chest compression indicator, like the one described in Norwegian Patent Application No. 2002 6218 by the present applicant, and which is hereby incorporated by reference, may be integrated in the chest plate. This indicator will emit a sound when the force used for the compression is exceeding a predetermined level. An indication of correct lung inflation may also be achieved by connecting the chest compression indicator with the inflatable body 1 by a cord extending through an opening in the lung. When the lung is inflated the chest plate will be lifted and create a pull in the cord. When the pulling force exceeds a certain level a sound or visual signal is emitted from the indicator.

FIG. 9 shows an embodiment of the manikin incorporating an additional feature. A small air bulb 31 is situated on one or each side of the neck portion 6. The neck bulb 31 is connected via a hose 32 with a balloon pump 33. The balloon pump 33 is situated in the cavity of the central portion 10. When chest compression is performed, the balloon pump will be compressed and force air into the small neck bulbs 31. The effect of this is a simulated neck pulse. Optionally, the balloon pump may be removed from the cavity and used by an instructor to simulate neck pulse.

FIG. 10 shows a second and preferred embodiment of the manikin of the present invention. It comprises the same main parts as in the previous embodiment, namely an inflatable body 1, a lung 2, a face mask 3 and a chest plate 4. The differences between the embodiment of FIG. 10 and the embodiment of FIG. 2 will be explained. A person of skill will understand that the features that are not specifically mentioned in the following are substantially similar in the two embodiments.

The chest plate 4 has a soft groove covering a substantial part of the sternum. A piece of soft material 40 is applied or inserted in this groove 40 to allow for hand placement during compression simulation with a higher degree of gentleness to the hands of the user and a reduced risk of slipping. The soft area may be made of the same material as the face mask 3.

The Xiphoid process 20 is retracted so that it is not protruding from the lower edge of the chest plate. Instead the Xiphoid process is situated fully within a recess 41 at the lower edge. This gives the user the same reference as in the embodiment of FIG. 2, but the chances for the Xiphoid process getting caught in other objects or getting damaged is reduced.

The elastic cord 22 does not extend all the way under the inflatable body 1. Instead the cord is divided into two separate cords 22a and 22b that each extends from the chest plate 4 to a pair of ears 42a and 42b formed on the side of the inflatable body 1. The two ends of each of the cords may be fastened, preferably detachably, to these ears 42a, 42b in any suitable way. Since the cord 22 provided an escape passage for air trapped under the inflatable body 1 in the embodiment of FIG. 2, this function is provided by other means in the embodiment of FIG. 10, as will be described below.

Instead of the cords providing an escape passage for the air trapped under the inflatable body 1 the chest plate 4 is on its underside provided with ribs (not show) that forms a wrinkle in the inflatable body 1, along which the air may escape. The inflation tube 43 may serve the same purpose extending under the inflated body part.

The width of the neck portion 6 is indented (not shown in detail) to facilitate a buckling of the neck when the head is tilted backward. This buckling form a linkage that reduces the force needed to hold the head in a backward position to a more realistic force.

The inside of the face mask 3 is provided with ribs that maintain the shape of the face mask 3. The mask has also been shaped at the edge 26 so that a backward tilt of the head is sufficient to open the airway from the nose and mouth portion to the lung without the need to lift the jaw 27. The airway may also be opened by lifting at the jaw 27 of the mask only.

FIG. 11 shows the manikin from the underside. This shows a modification of the means for filling the inflatable body 1. A tube 43 is coupled to the inflatable body 1 at 44 between the neck portion and the central part 10. The central part 10 has, instead of two smaller holes, a full opening. The tube 43 extends across the opening in the central part 10 and through an ear 44 formed in the inflatable body 1 at the lower edge thereof. At the outer end of the tube a closure 45, which may be a similar closure to the type of closure used on inflatable toys, is present. However, the closure 45 does not have any non-return valve as is common in inflatable toys. Instead the tube 43 has a resilient portion 46 that may be pinched off to prevent air form escaping during filling of the inflatable body 1. This allows for a more rapid deflation of the body 1.

FIG. 12a shows a lung that can be used together with the mask shown in FIG. 5a, with a circular flange 25. The lung 2 has a lower fastening band 48 the end thereof having the shape of an arrow. The lung also comprises a mask connecting portion 49. In this part there is an opening 50 in one of the walls of the lung. The lung also comprises a leak hole 55 that is sized to let air escape when the lung is to be deflated. The size of this leak hole 55 is small enough to not play a significant role in letting air escape when the lung is inflated, but large enough to let the air escape within a normal exhalation period when the inflation is stopped. The hole will also act to prevent an over inflation of the lung 2. It will also act to prevent visible chest rise unless the inflated volume is greater than 250 ml. The hole may also be provided with a sound generating means, e.g., a whistle, or a visible roll-out extension.

FIG. 12b shows a lung 2 intended for use in the embodiment of FIG. 10 in detail. It comprises a neck portion 14 and a chest portion 13 as the lung described in connection with FIG. 12a. In addition it comprises a neck band 47 that consists of two parts 47a and 47b extending in opposite directions from either side of the neck portion 14. The first part 47a has the shape of an arrow and the end of the second part 47b has the shape of a ring. The mask connecting portion 49 is oblong to fit a mask as described in FIGS. 5b-d.

The neck band 47 is fastened around the neck portion 6 of the inflatable body 1 by threading the pointed end of the band part 47a through the ring of band part 47b (see FIG. 15). The neck band 47 functions as a collar both to hold the lung in place and stretch the neck portion 14 of the lung 2. This will close the airway and prevent air from flowing back to the mask once the lung is inflated. This function may also be fulfilled with the aid of a rubber band extending around the neck portion 6.

The lower fastening band 48 may be thread through a second hole 51 in the ear 44 or if feasible through the same hole as the tube 43. This will further assist in keeping the lung in place on the inflatable body.

FIGS. 13a-c shows the lung 2 attached to the face mask 3 with various combinations of lung and face mask. In FIG. 13a a mask according to FIG. 5a is combined with a lung according to FIG. 12a. In FIG. 13b a mask according to FIG. 5c is coupled to a lung according to FIG. 12b. In FIG. 13c a mask according to FIG. 5d is coupled to a lung according to FIG. 12b.

Additional features are also possible with the present invention

It is also possible to use a pump (not shown) to inflate (and deflate) the body 1, to avoid contamination of the valve 9. This may also incorporate a relief valve that will prevent overfilling of the body and ensure correct filling. To facilitate the correct inflation pressure of the inflatable body 1, the body may also have indicia printed thereon that form a certain shape, e.g., a straight line, when the body is filled with correct pressure. Alternatively, the body may assume a certain, easily distinguishable, shape when the correct pressure is reached.

The chest plate may be planar or have a certain topography resembling a human chest.

In stead of an elastic cord other elastic means may also be used to connect the chest plate to the inflatable body, like elastic net.

An elastic fabric may be wrapped over the chest plate and the chest portion of the body. This may replace the elastic cords.

The lung may also be situated on top of the chest plate or below the body.

FIG. 14 shows a portion of the manikin of FIG. 10, showing the neck portion in detail. Instead of pinching the neck portion of the lung between the mask and the inflatable body to block the air passage, a weakening zone in the neck, to which the neck portion of the lung is fastened with a neck band 47a, 47b, allows air to pass when the head is tilted and/or the chin is lifted.

The mask and lung may be replaceable as a unit to prevent contamination and avoid cleaning. The lung may have a closable opening at the bottom that can be used to let a cleaning fluid, e.g., soap or a mild disinfectant and subsequent flushing with water directly from the faucet, run though the lung, and for airing out moisture.

Suitable materials for the various components are:

Inflatable body, mask and lung are preferably made of a soft plastic material, suitably a thermoplastic like PVC. PVC has a reasonably low cost and is easy the clean. Choosing the same material type for all these parts reduces the risk for chemical reactions between these parts.

The chest plate is preferably made of relatively stiff plastic material and suitably a thermoplastic. This may also be PVC, but more preferably polyamide with a thermoplastic elastomer (TPE), since this is generally more durable than PVC.

A thermosetting plastic may also be used.

The invention claimed is:

1. A manikin for practicing cardiopulmonary resuscitation, comprising a flexible, inflatable body that is adapted be filled with a gas, characterized in that: the inflatable body has the shape of at least an upper part of a human body, comprising a chest portion and a head; the inflatable body retains the gas within the inflatable body, and is adapted to absorb the full compression force, so that the gas confined in the inflatable body is compressed as the inflatable body is being deformed by compression force exerted during simulated chest compression provided by a human; the inflatable body deflates and folds into a small height; and the inflatable body further comprises a lung part, the lung part being adapted for inflation, and being positioned outside the inflatable body and parallel to a chest portion of the inflatable body, the head including an expansion chamber that expands during chest compression, the inflatable body further comprising a face mask, the face mask having a mouth and/or nose providing an inlet for air or gas into the lung, the face mask being positioned at the head portion of the inflatable body, the face mask including a chin portion comprising an edge, the edge pinching a portion of the lung against the inflatable body in a first state, in which first state the head portion is lying in the same plane as the chest portion of the inflatable body, and the edge being lifted away from the lung portion when the head portion is tilted relative to a chest portion, and the inflatable body including a chest plate, the chest plate acting as a pressure distributor on the inflatable body, the chest plate being connected to the inflatable body by an elastic portion, and a ring shaped portion of the inflatable body providing a support for the chest plate.

2. The resuscitation training manikin according to claim 1, characterized in that the inflatable body has a central portion defining a cavity, the cavity being circumscribed by the generally ring-shaped inflatable portion of the inflatable body.

3. The resuscitation training manikin according to claim 2, characterized in that the cavity of the central portion being adapted to receive a portion of the lung during a first phase of lung inflation.

4. The resuscitation training manikin according to claim 3, further including an elastic portion positioned in the side of the cavity facing the lung, the elastic portion forcing the portion of the lung expanded into the cavity substantially out of the cavity.

5. The resuscitation training manikin according to claim 1, characterized in that the head portion acting as an expansion chamber during chest compression.

6. The resuscitation training manikin according to claim 1, characterized in that a neck portion of the inflatable body has a weakening zone, a neck portion of the lung part being fastened to the neck portion of the inflatable body, the weakening zone allowing air to pass when the head of the inflatable body is tilted.

7. The resuscitation training manikin according to claim 1, characterized in that a chest compression feedback device is integrated in the chest plate, the feedback device emitting an audible or visible signal when one selected from the group consisting of a predetermined compression force and a predetermined depth is exceeded.

8. The resuscitation training manikin according to claim 1, characterized in that the inflatable body is adapted to be deflated and folded into a small height together with the chest plate, lung part portion and face mask.

9. The resuscitation training manikin according to claim 1, characterized in that a leakage opening is disposed in the lung portion.

10. The resuscitation training manikin according to claim 1, wherein the chest plate is constructed from a relatively stiff thermoplastic elastomer plastic.

11. The resuscitation training manikin according to claim 1 wherein the inflatable body is constructed primarily from a plastic material.

12. The resuscitation training manikin according to claim 1, wherein
the inflatable body includes an inflation valve to retain the gas within the inflatable body when closed, so that the gas confined in the inflatable body is compressed as the inflatable body is being deformed by compression forced exerted during simulated chest compression, and to allow deflation of the inflatable body when opened and the manikin is not in use;
the inflatable body is substantially empty except for gas when inflated; and
the head portion acts as an expansion chamber during chest compression.

13. A manikin for practicing cardiopulmonary resuscitation, comprising a flexible, inflatable body that is adapted be filled with a gas, characterized in that: the inflatable body has the shape of at least an upper part of a human body, comprising a chest portion and a head; the inflatable body retains the gas within the inflatable body, and is adapted to absorb the full compression force, so that the gas confined in the inflatable body is compressed as the inflatable body is being deformed by compression force exerted during simulated chest compression provided by a human; the inflatable body is adapted to be deflated and folded into a small height; and the inflatable body further comprises a chest plate, the chest plate being situated on the outside of the inflatable body and being connected to the inflatable body and acting as a pressure distributor on the inflatable body, wherein the chest plate being connected to the inflatable body by an elastic portion, and wherein a ring shaped portion of the inflatable body providing a support for the chest plate; the head including an expansion chamber that expands during chest compression; and the inflatable body further comprises a face mask, the face mask having a mouth and/or nose providing an inlet for air or gas into the lung, the face mask being positioned at the head portion of the inflatable body, and wherein the face mask including a chin portion comprising an edge, the edge pinching a portion of the lung against the inflatable body in a first state, in which first state the head portion is lying in the same plane as the chest portion of the inflatable body, and the edge being lifted away from the lung portion when the head portion is tilted relative to a chest portion.

14. The resuscitation training manikin according to claim 1, characterized in that the inflatable body has a central portion defining a cavity, the cavity being circumscribed by the generally ring-shaped inflatable portion.

15. The resuscitation training manikin according to claim 14, characterized in that the cavity of the central portion being adapted to receive a portion of the lung during a first phase of lung inflation.

16. The resuscitation training manikin according to claim 15, characterized in that a side of the cavity facing the lung has an elastic element for forcing the portion of the lung expanded into the cavity substantially out of the cavity.

17. The resuscitation training manikin according to claim 13, characterized in that the head portion acts as an expansion chamber during chest compression.

18. The resuscitation training manikin according to claim 13, characterized in that a neck portion of the inflatable body has a weakening zone, a neck portion of the lung part being fastened to the neck portion of the inflatable body, the weakening zone allowing air to pass when the head of the inflatable body is tilted.

19. The resuscitation training manikin according to claim 13, characterized in that a chest compression feedback device is integrated in the chest plate, the feedback device emitting an audible or visible signal when one selected from the group consisting of a predetermined compression force and a predetermined depth is exceeded.

20. The resuscitation training manikin according to claim 13, characterized in that a leakage opening is disposed in the lung portion.

21. The resuscitation training manikin according to claim 13, wherein the chest plate is constructed from a relatively stiff thermoplastic elastomer plastic.

22. The resuscitation training manikin according to claim 13 wherein the inflatable body is constructed primarily from a plastic material.

23. The resuscitation training manikin according to claim 13, wherein
the inflatable body includes an inflation valve to retain the gas within the inflatable body when closed, so that the gas confined in the inflatable body is compressed as the inflatable body is being deformed by compression forced exerted during simulated chest compression, and to allow deflation of the inflatable body when opened and the manikin is not in use;
the inflatable body is substantially empty except for gas when inflated; and
the head portion acts as an expansion chamber during chest compression.

24. A manikin for practicing cardiopulmonary resuscitation, comprising a flexible, inflatable body that is adapted be filled with a gas, characterized in that: the inflatable body has the shape of at least an upper part of a human body, comprising a chest portion and a head portion; the head portion adapted to act as an expansion chamber during chest compression the inflatable body retains the gas within the inflatable body, and is adapted to absorb the full compression force, so that the gas confined in the inflatable body is compressed as the inflatable body is being deformed by compression force exerted during simulated chest compression provided by a human; the inflatable body deflates and folds into a small height; and the inflatable body further comprises a lung part, the lung part being adapted for inflation, and being positioned outside the inflatable body and parallel to a chest portion of the inflatable body, the inflatable body further comprises a face mask, the face mask having a mouth and/or nose providing an inlet for air or gas into the lung, the face mask being positioned at the head portion of the inflatable body, the face mask includes a chin portion comprising an edge, the edge pinching a portion of the lung against the inflatable body in a first state, in which first state the head portion is lying in the same plane as the chest portion of the inflatable body, and the edge being lifted away from the lung portion when the head portion is tilted relative to a chest portion, and the inflatable body further comprises a chest plate, the chest plate acting as a pressure distributor on the inflatable body, the chest plate being connected to the inflatable body by an elastic portion, and a ring shaped portion of the inflatable body providing a support for the chest plate.

* * * * *